(12) United States Patent
Moersch

(10) Patent No.: US 9,500,533 B2
(45) Date of Patent: Nov. 22, 2016

(54) TEMPERATURE-COMPENSATED MEASURING PROBE TO BE RECEIVED IN A WORKPIECE-PROCESSING MACHINE, AND TEMPERATURE COMPENSATION OF A MEASURING PROBE

(71) Applicant: BLUM-NOVOTEST GmbH, Gruenkraut-Gullen (DE)

(72) Inventor: Norbert Moersch, Wangen (DE)

(73) Assignee: Blum-Novotest GmbH (DE)

( * ) Notice: Subject to any disclaimer, the term of this patent is extended or adjusted under 35 U.S.C. 154(b) by 271 days.

(21) Appl. No.: 14/166,429

(22) Filed: Jan. 28, 2014

(65) Prior Publication Data
US 2014/0211828 A1  Jul. 31, 2014

(30) Foreign Application Priority Data

Jan. 28, 2013 (DE) .................. 10 2013 001 457

(51) Int. Cl.
| | |
|---|---|
| *G01K 1/20* | (2006.01) |
| *G01B 5/00* | (2006.01) |
| *G01B 5/004* | (2006.01) |
| *G01B 7/004* | (2006.01) |
| *G01B 11/00* | (2006.01) |
| *G01B 21/04* | (2006.01) |

(52) U.S. Cl.
CPC ............. *G01K 1/20* (2013.01); *G01B 5/004* (2013.01); *G01B 5/0014* (2013.01); *G01B 7/004* (2013.01); *G01B 11/002* (2013.01); *G01B 21/04* (2013.01)

(58) Field of Classification Search
CPC ...... G01K 1/20; G01B 21/04; G01B 11/002; G01B 7/004; G01B 5/004; G01B 5/0014

USPC ............... 33/503, 561, 558; 374/55, 56, 142
See application file for complete search history.

(56) References Cited

U.S. PATENT DOCUMENTS

| | | | |
|---|---|---|---|
| 3,250,012 A | 5/1966 | Hilton et al. | |
| 4,972,594 A | 11/1990 | Gurny et al. | |
| 5,052,121 A * | 10/1991 | Wachtler | G01B 5/0014 33/555.1 |

(Continued)

FOREIGN PATENT DOCUMENTS

| | | | |
|---|---|---|---|
| DE | EP 0349783 A2 * | 1/1990 | ......... B23Q 11/0003 |
| DE | 42 17 641 A1 | 12/1993 | |

(Continued)

*Primary Examiner* — Lisa Caputo
*Assistant Examiner* — Jonathan Dunlap
(74) *Attorney, Agent, or Firm* — Tarolli, Sundheim, Covell & Tummino LLP

(57) ABSTRACT

The proposed temperature compensation for a measuring probe to be received in a workpiece-processing machine provides a measuring probe, measuring in contacting or non-contacting manner, for registering measured values in respect of a workpiece and for outputting signals that are representative of the measured values, whereby the measuring probe exhibits a probing device for one-dimensional or multi-dimensional probing of a workpiece, at least one probing sensor for converting such probing operations into the representative signals, at least one temperature sensor which has been received in the measuring probe in order to generate a signal that is representative of the temperature of the measuring probe, and a linking device which links the signals of the probing sensor with the signals of the temperature sensor to yield a temperature-compensated probing signal which is intended to be output to a numerical control system of the workpiece-processing machine.

16 Claims, 8 Drawing Sheets

(56) References Cited

U.S. PATENT DOCUMENTS

| | | | | |
|---|---|---|---|---|
| 5,623,857 | A * | 4/1997 | Sakuraba | B23Q 15/18 409/135 |
| 6,019,506 | A * | 2/2000 | Senda | B23Q 11/0003 374/55 |
| 6,090,205 | A | 7/2000 | Sakai et al. | |
| 6,532,680 | B2 * | 3/2003 | Braasch | G01B 7/16 33/503 |
| 7,395,606 | B2 * | 7/2008 | Crampton | B25J 13/088 33/503 |
| 7,735,234 | B2 * | 6/2010 | Briggs | G01B 5/008 33/502 |
| 7,788,819 | B2 * | 9/2010 | Hon | B23Q 17/20 33/503 |
| 8,104,189 | B2 * | 1/2012 | Tait | G01B 5/008 33/503 |
| 8,171,650 | B2 * | 5/2012 | York | G01B 5/012 33/503 |
| 8,220,173 | B2 * | 7/2012 | Tait | G01B 5/008 33/503 |
| 8,676,527 | B2 * | 3/2014 | Ono | G01B 21/045 33/503 |
| 8,919,005 | B2 * | 12/2014 | Mamour | G01B 5/0014 33/503 |
| 9,057,599 | B2 * | 6/2015 | Mariller | G01B 5/012 |
| 2002/0104227 | A1 * | 8/2002 | Trull | G01B 5/012 33/558 |
| 2005/0166413 | A1 * | 8/2005 | Crampton | B25J 13/088 33/503 |
| 2010/0101105 | A1 * | 4/2010 | Hon | B23Q 17/20 33/503 |
| 2010/0132207 | A1 * | 6/2010 | Mamour | G01B 5/0014 33/503 |
| 2010/0325907 | A1 * | 12/2010 | Tait | G01B 5/008 33/503 |
| 2011/0061253 | A1 * | 3/2011 | Jonas | G01B 21/045 33/503 |
| 2012/0004886 | A1 * | 1/2012 | Jordil | G01B 7/287 702/150 |
| 2012/0029857 | A1 * | 2/2012 | Ono | G01B 21/045 702/95 |
| 2013/0205609 | A1 * | 8/2013 | Gambini | G01B 5/016 33/561 |
| 2013/0227850 | A1 * | 9/2013 | Singh | G01B 5/008 33/502 |
| 2015/0131697 | A1 * | 5/2015 | Sakai | G01B 21/045 374/56 |

FOREIGN PATENT DOCUMENTS

| | | |
|---|---|---|
| DE | 10 2007 043 030 A1 | 3/2009 |
| DE | 102 62 188 A1 | 5/2010 |
| WO | WO 00/17602 A1 | 3/2000 |

* cited by examiner

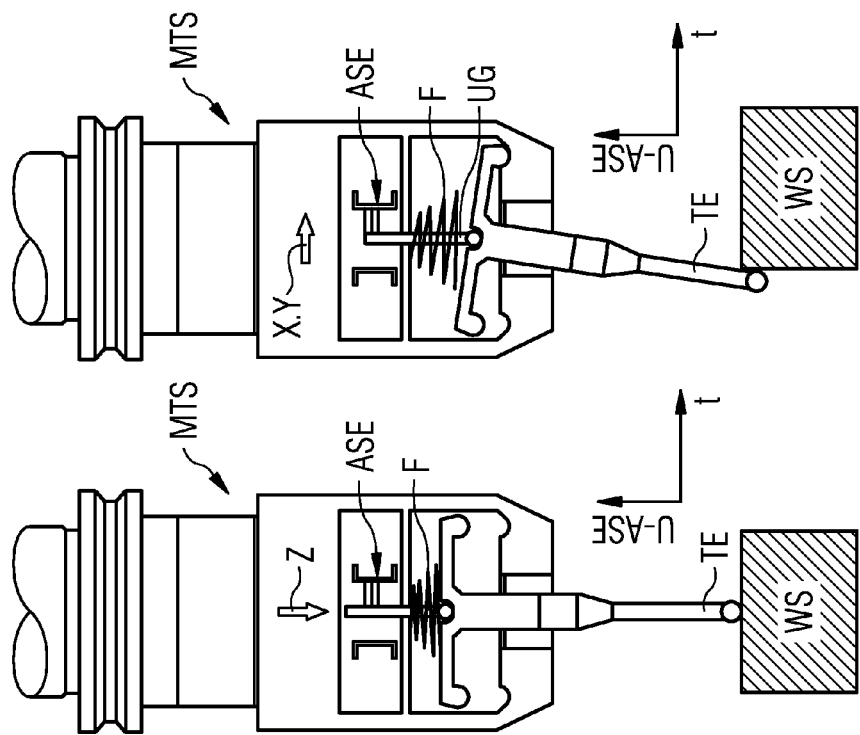
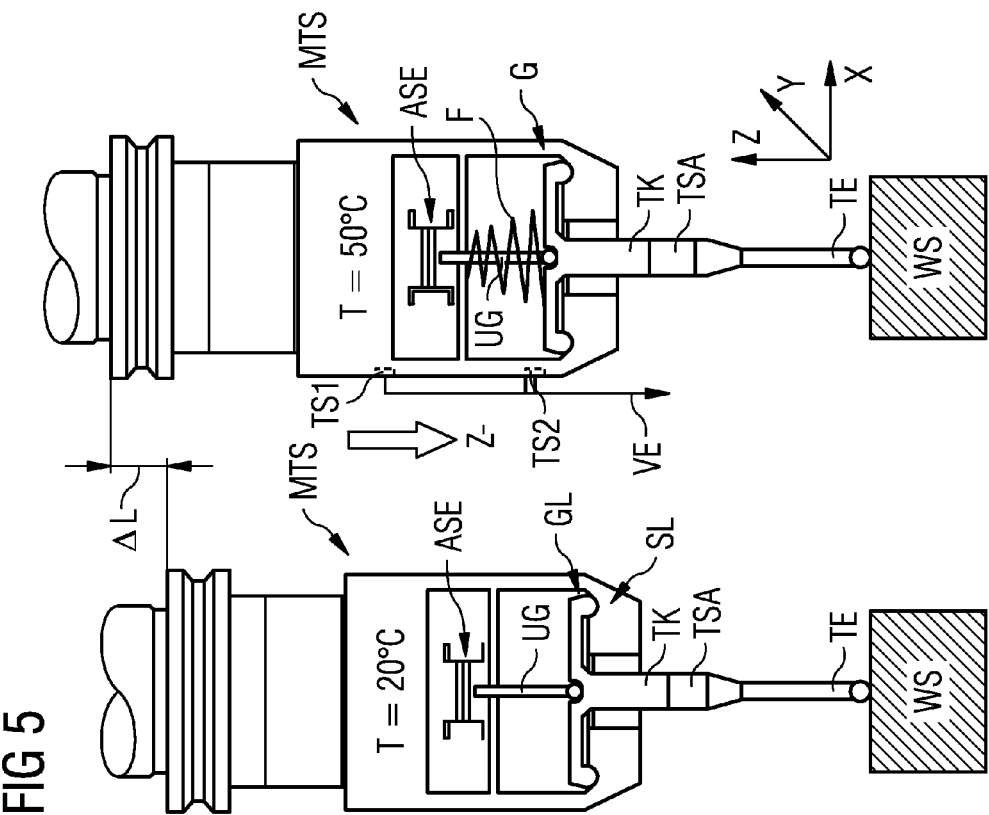

FZ := axial force component
FZ (a) = f (Fmax, R, L, a);
FZ (a=0°) = zero% * Fmax;
FZ (a=90°) = 100% * Fmax;

TEMPERATURE-COMPENSATED MEASURING PROBE TO BE RECEIVED IN A WORKPIECE-PROCESSING MACHINE, AND TEMPERATURE COMPENSATION OF A MEASURING PROBE

CROSS-REFERENCE TO RELATED APPLICATION

The present application claims priority from DE 10 2013 001 457.3, filed 28 Jan. 2013, which is incorporated herein by reference in its entirety.

BACKGROUND

Described herein are a temperature compensation of a measuring probe to be received in a workpiece-processing machine, and a temperature-compensated measuring probe.

The workpiece-processing machine may be a (numerically controlled) machine tool, a (multiaxial) machining centre, a multiaxial milling machine or such like. In the following, the term 'machine tool' will also be used for all these machines or machines of such a type. Such a machine has a spindle on which a tool or a workpiece has been mounted; the spindle may be permanently positioned or, for example, may be moved and driven in three orthogonal directions X, Y and Z within a working space of the machine.

The tool can be moved by the machine tool into a measuring space—a region established for the purpose of measurement—of a probe operating in contacting or non-contacting manner. The probe operating in non-contacting manner detects the proximity of a surface with, for example, a capacitive, inductive or optical device. The probe operating in contacting manner detects a surface upon contact. For each detected feature, contacting and non-contacting probes relay corresponding measured data to a numerical (machine) control system which may include a computer program. Together with machine-position information from the control system, the measured data of the probe make it possible that the (numerical) control system can ascertain a precise picture of the dimensions of the tool or workpiece.

STATE OF THE ART

A multi-directional measuring probe is known from DE 102 62 188 A1. This measuring probe has a housing in which an annular support bearing has been formed which defines an X,Y bearing plane and a central axis Z, normal thereto, of the measuring probe. A supporting body has an annular counter-bearing by which a longitudinal axis of the supporting body has been defined. A spring has been clamped between the housing and the supporting body and endeavours to keep the latter in a position of rest in which the counter-bearing abuts the support bearing and the longitudinal axis of the supporting body coincides with the central axis Z of the measuring probe. A stylus socket has been arranged centrally on the supporting body, in order to receive a stylus. A transmission member is guided in the housing so as to be displaceable along the central axis Z in order to convert arbitrary deflections of the supporting body out of its position of rest into rectilinear motions. A sensor converts such motions of the transmission member into measuring signals. One end of the transmission member has been arranged centrically on the stylus socket, and only a portion adjoining the other end is guided in the direction of the central axis Z. The transmission member has been arranged at a place on the supporting body that, viewed from the sensor, lies beyond the bearing plane. The sensor may be part of a light barrier with a displacement-dependent analogue measuring signal. The stylus socket may be guided along the longitudinal axis of the supporting body so as to be displaceable on the latter, and may have been resiliently biased in the direction towards a normal position defined by a stop.

From U.S. Pat. No. 3,250,012 A a measuring probe with a cylindrical housing is known which is composed of a proximal housing part and a distal housing part. The proximal housing part has a flange projecting radially outwards for fastening the measuring probe to a slide of a measuring machine or machine tool. The distal housing part terminates with a flange projecting radially inwards, on which a spherical-segment-shaped concave support bearing has been formed. On this support bearing there rests an approximately hemispherical supporting body which with its convex external surface forms an annular counter-bearing and on its proximal side exhibits a flat annular surface. This annular surface is abutted by a front face of a piston-like transmission member which is guided in the distal housing part so as to be axially displaceable and which has been loaded by a spring clamped between the transmission member and the end of the proximal housing part facing towards said member. In the housing and partly in the piston-like transmission member a sensor has been accommodated which transforms axial displacements of the piston into measuring signals. A stylus socket, on which a stylus with a probing head has been fastened, extends axially away from the supporting body.

Measuring probes are likewise known from WO 00/17602 A1. In this case the transmission member is a straight piece of wire of considerable length and has been accommodated in a housing, the length of which substantially exceeds that of the transmission member. A similar multi-directional measuring probe is known from DE 42 17 641 A1.

Therein also, a hemispherical supporting body has been arranged within a distal housing part, against which a transmission member in the form of a spring-loading piston presses. However, the flat face of the hemispherical supporting body here is that one, away from which the stylus socket extends, whereas the spherical face of the supporting body is faced towards the again piston-like transmission member and via the latter is loaded in the axial direction by a spring.

From his operational practice the Applicant is familiar with machine tools having tool sockets, and with measuring probes which have to be inserted into the tool socket of the machine tools. A machine tool may exhibit, for example for the purpose of high-speed machining, a revolving spindle shaft and a shaft housing for supporting the spindle shaft. By reason of the high rotary speeds of the spindle shaft, the spindle shaft and also the shaft housing become heated. Therefore the shaft housing of the spindle shaft is equipped with a cooling system which, however, does not suffice, as a rule, to dissipate the heat completely. The input, unavoidable in operation, of heat to the tool socket clamped in the spindle shaft, and to the tool fastened therein, results in thermally conditioned measuring errors and machining defects. In the event of an exchange of a tool socket, the latter at first has ambient temperature; likewise a tool arranged therein, such as a measuring probe for example. The heating resulting from the input of heat into the spindle shaft has the consequence that the tool socket and the tool lengthen. If a workpiece is now approached by the measuring probe in the probing direction 'Z', the heated measuring probe then touches the workpiece earlier than would be the case with a measuring probe that has not been heated. As a result, the measuring probe is deflected prematurely. This has the consequence that a 'deflected' signal is transmitted earlier than would be correct (where appropriate, via a receiver) to a (numerical) machine control system of the workpiece-processing machine, and is received therein. At the time of the 'deflected' signal, the actual position of the Z-axis is read out by the machine control system on the measuring system within the machine. This position differs from the correct value by the same amount by which the measuring probe has been lengthened. This faulty measurement accordingly corresponds to the degree of thermally induced lengthening of the measuring probe.

None of these arrangements takes account of changes in dimension of the measuring probe resulting from fluctuations in temperature.

A tool socket and also a measuring probe with a tool socket are known from DE 10 2007 043 030 A1. The tool socket serves for fitting a measuring probe to a machine tool with an interface. Viewed from the interface for the spindle, the tool socket has a material portion that differs from the customary base material of a tool socket by virtue of a lower coefficient of linear expansion or a lower thermal conductivity. In this way, an undesirably large input of heat into the tool socket is avoided, so that a thermal expansion remains comparatively slight. A change in dimension by virtue of thermal expansion is thereby to be reduced to a still tolerable degree. In this connection, by virtue of location, dimensional design and choice of material of the material portion a thermal expansion of the tool socket from the interface as far as a tool is reduced under customary temperature conditions in respect of motor spindles after the insertion of a tool socket. The material portion may in this connection comprise the complete tool socket as far as, for example, a measuring probe, so that the tool socket has been formed completely from a material having a lower coefficient of linear expansion or a lower thermal conductivity. An input of heat into a region downstream of the material portion, for example into a measuring probe, and into the material portion, is to be distinctly delayed in this way. However, fluctuations in temperature arising from the environment of the machine tool, for example from the working space of a machining centre, which likewise change the measuring probe or the tool as regards its length, cannot be compensated. In addition, with this concept it takes a relatively long time until thermally stable conditions have set in after an exchange of the measuring probe or of the tool.

UNDERLYING PROBLEM

The objective of the temperature compensation presented herein is to take account of the temperature-induced change in length of the measuring probe in such a way that measuring errors due to changes of temperature are reduced to a minimum.

SOLUTION

The proposed temperature compensation for a measuring probe to be received in a workpiece-processing machine provides a measuring probe, measuring in contacting or non-contacting manner, for registering measured values in respect of a workpiece and for outputting signals that are representative of the measured values, whereby the measuring probe exhibits a probing device for one-dimensional or multi-dimensional probing of a workpiece, at least one probing sensor for converting such probing operations into the representative signals, at least one temperature sensor which has been received in the measuring probe in order to generate a signal that is representative of the temperature of the measuring probe, and a linking device which links the signals of the probing sensor with the signals of the temperature sensor to yield a temperature-compensated probing signal which is intended to be output to a numerical control system of the workpiece-processing machine.

By 'measuring probe' here, both a tool scanner and a workpiece scanner are understood. By 'temperature of the measuring probe' here, the temperature is understood that results by virtue of thermal radiation from the environment of the measuring probe and also by virtue of conduction of heat from components in the measuring probe that are mechanically connected to the measuring probe, and also by virtue of heating of the measuring probe from the environment thereof via convection. By a 'measured value' here, both a binary switching signal '0', '1' and an analogue result of measurement, for example '0.000' . . . '10.000' is understood, whereby the type of coding, that is to say, for example, as a voltage value or current value or as a digitally coded pulse train, is irrelevant. Similarly, by a 'workpiece' here, both a tool and a workpiece are understood, depending on the measuring task. In addition, the measuring probe may have been set up to communicate—either directly or, for example, in wireless manner via a receiving interface of the measuring probe—with a numerical control system of the workpiece-processing machine.

This temperature compensation presented herein has the advantage that a temperature-compensated probing signal is already made available to the numerical control system of the workpiece-processing machine. Consequently the measuring probe provides a probing signal that, taken by itself, can be processed further immediately in the numerical control system, without, for example, an arithmetical temperature compensation of the probing signal also having to be undertaken therein. The probing signal can therefore be transmitted in a standardised data protocol. In addition, no separate temperature-value signal has to be transmitted to the numerical control system. In this way, the measuring probe that has been temperature-compensated in such a manner can be employed directly together with the most diverse numerical control systems. However, variants have also been provided in which, instead or additionally, one or more strain gauges have been fitted to the measuring probe in order to measure a temperature-conditioned lengthening of the measuring probe at a representative place and to transmit this result of measurement to the numerical control system of the workpiece-processing machine for setting off. The respective results of measurement can also be converted into changes in length by virtue of a prior calibration.

By a 'probing operation' here, any relative motion between the measuring probe and a workpiece is understood which, where appropriate, gives rise to a transition in the probing signal between 'not probed' and 'probed' or conversely.

In a variant of the temperature-compensated measuring probe, several temperature sensors have been received in the measuring probe, the signals of which are linked in the linking device with the signals of the probing sensor. Hence varying structural portions of the measuring probe and the materials or temperature-conditioned properties thereof (thermal conductivity, coefficient of thermal expansion) can be taken into account for the purpose of still more precise temperature compensation of the probing signal than would be possible with only one temperature sensor. With only one temperature sensor the temperature of the measuring probe is registered at a position found by experiments. The temperature ascertained at this place is then representative of the temperature of the entire measuring probe. In this connection the fact is exploited that during the phase of heating of the measuring probe there are locations in the latter having a temperature that lies above the temperature measured by the temperature sensor, and locations having a temperature that lies below the temperature registered by the temperature sensor. Through the use of two or more temperature sensors, the temperature distribution in the measuring probe can be ascertained more exactly. Consequently a more exact temperature compensation of the measuring probe can also be carried out.

In a further variant of the temperature-compensated measuring probe the (non-temperature-compensated) signals of the probing sensor are linked with the signals of the temperature sensor, for example in the linking device, to yield a temperature-compensated probing signal in such a manner that, depending on the temperature that the signal of the/each temperature sensor reflects, a signal of the probing sensor is output in time-delayed manner as temperature-compensated probing signal. In particular, if the probing speed of the measuring probe in the measuring direction (X/Y direction or Z direction) and, where appropriate, the time of propagation of the (non-temperature-compensated) probing signal from the measuring probe to the numerical control system are known, the degree of the delay of the transmission of the probing signal relative to the change in temperature of the measuring probe can be established.

If, for example, the measuring probe lengthens by 1 μm per 1 K rise in temperature, and the relative probing speed between workpiece and measuring probe amounts to 40 mm/s, according to the temperature compensation presented herein the transmission of the probing signal to the numerical control system is delayed by 25 μs per 1 K rise in temperature. Since the probing signal arrives at the numerical control system delayed by 25 μs, said system reacts in correspondingly delayed manner. As a result, the measuring probe moves on in the probing direction by precisely the distance 1 μm by which the measuring probe has been lengthened by virtue of the rise in temperature. This can be registered by the displacement-registration system of the workpiece-processing machine and can be processed in the numerical control system of the workpiece-processing machine. As a result, in this way the lengthening of the measuring probe has no influence—diminishing the precision of machining of the workpiece—on processing or on the control of the workpiece-processing machine.

In another variant of the temperature-compensated measuring probe, the (non-temperature-compensated) signals of the probing sensor are linked with the signals of the/each temperature sensor, for example in the linking device, to yield a temperature-compensated probing signal in such a manner that in a (analogue displacement-dependent) signal of the probing sensor a switching threshold (=transition between 'not probed' and 'probed') is changed, depending on the temperature that the signal of the/each temperature sensor reflects, so that the signal of the probing sensor is output as temperature-compensated probing signal. In this connection the switching threshold is changed, depending on the temperature (and also, where appropriate, on the measuring direction (X/Y direction or Z direction) of the measuring probe). In this manner the switching-time is shifted in a way resulting from the temperature-conditioned change in length and from the (constant) probing speed of the measuring probe. A further advantage of this variant is that the compensation of the Z probing signal is independent of the probing speed. In this case the probing speed cannot be utilised for the purpose of distinguishing or recognising the probing direction.

In a further variant of the temperature-compensated measuring probe, the linking device links the signals of the at least one probing sensor with the signals of the/each temperature sensor to yield a temperature-compensated probing signal in such a manner that the signals of the/each temperature sensor are changed in accordance with a stored function with respect to time, progression and/or magnitude, and an appropriate switching threshold is specified to the at least one probing sensor.

In a variant of the temperature-compensated measuring probe the measuring probe has a housing in which an annular support bearing has been formed which defines an X,Y bearing plane ands a central Z axis, normal thereto, of the measuring probe. A supporting body has an annular counter-bearing, by which a longitudinal axis of the supporting body has been defined. A spring has been clamped between the housing and the supporting body and endeavours to keep the latter in a position of rest in which the counter-bearing abuts the support bearing and the longitudinal axis of the supporting body coincides at least approximately with the central axis Z of the measuring probe. A stylus socket has been arranged centrally on the supporting body, in order to receive a stylus. Alternatively the stylus socket may also be a permanent constituent of the supporting body, so that the stylus socket is not displaceable relative to the supporting body. A transmission member is guided in the housing so as to be displaceable along the central Z axis in order to convert arbitrary deflections of the supporting body out of its position of rest into rectilinear motions. In this connection the transmission member may have been connected to the supporting body via a ball joint. The motion of the transmission member in this case is not exactly rectilinear along the Z axis; rather, the transmission member executes a type of wobbling motion in the event of deflections in the X,Y bearing plane of the measuring probe.

The probing sensor converts such motions of the transmission member into the signals. One end of the transmission member has been arranged centrically on the stylus socket, and only a portion adjoining the other end is guided in the direction of the central axis Z. The transmission member has been arranged at a place on the supporting body that, viewed from the probing sensor, lies beyond the bearing plane.

The probing sensor may in this case be part of a light barrier with displacement-dependent analogue measuring signal, or may be a sensor switching in binary manner. The stylus socket can be guided along the longitudinal axis of the supporting body so as to be displaceable on the latter, and may have been resiliently biased in the direction towards a normal position defined by a stop. In such a measuring probe a motion-direction detector has been provided which has been set up at least to distinguish relative motions between the measuring probe and a workpiece along the central Z axis of the measuring probe from motions in the X,Y bearing plane of the measuring probe, and to emit signals reflecting this to the linking device. The linking device has been set up to output temperature-compensated probing signals in the case of relative motions between the measuring probe and a workpiece along the central Z axis of the measuring probe, and to output non-temperature-compensated signals of the probing sensor in the case of relative motions between the measuring probe and a workpiece along the central Z axis of the measuring probe in the X,Y bearing plane of the measuring probe.

A multi-dimensional measuring probe can be utilised both for probing operations in the case of measurements in the Z direction and for lateral measurements in the X and Y directions. Whereas the heating primarily lengthens (in the Z direction) the measuring probe by reason of its structure and its proportions, the probing sphere remains exactly in the central Z axis of the measuring probe. This means that (temperature-conditioned) changes in length of the measuring probe do not, in a first approximation, influence the correctness/precision of measurements in the X,Y direction. The temperature compensation accordingly must not be undertaken in the case of X, Y probing operations. The measuring mechanism of a measuring probe consists of a fixed part, which has been permanently connected to the housing of the measuring probe and embodies the support for the mobile part, and of a mobile part. The latter is held in a stable position of rest in the fixed part by means of spring force. The mobile part receives the stylus. If the probing sphere of the stylus is deflected upon contact with the workpiece, then the associated motion of the mobile part of the measuring mechanism is recorded by a suitable sensor and evaluated by the electronics of the instrument. In most measuring probes that are employed in machine tools the form of the mobile part of the measuring mechanism determines that the signal alteration at the sensor is accomplished more quickly in the case of a deflection in the Z direction than in the case of a deflection in the X,Y direction. In this connection it holds that the probing speeds utilised by the machine are identical for all directions (X, Y and Z). Consequently the motion-direction detector can appraise a high signal-alteration rate of the displacement-dependent analogue measuring signals of the probing sensor as relative motions between the measuring probe and a workpiece along the central Z axis of the measuring probe, and (given comparable probing speed) can appraise a comparatively low signal-alteration rate of the displacement-dependent analogue measuring signals of the probing sensor relative motions between the measuring probe and a workpiece in the X,Y bearing plane of the measuring probe.

In another variant of the temperature-compensated measuring probe, several motion-direction sensors for the varying directions of motion of the relative motions between the measuring probe and a workpiece have been provided, by virtue of the mechanical arrangement and orientation of which it is ensured that only in the case of a motion-direction sensor assigned to the Z direction is a signal activating the temperature compensation output to the linking device.

In a further variant of the temperature-compensated measuring probe, acceleration sensors have been provided, in order to register the varying directions of motion of the measuring probe. By virtue of the mechanical arrangement and orientation thereof, it is ensured that only in the case of a motion-direction sensor assigned to the Z direction is a signal activating the temperature compensation output to the linking device. This variant of a temperature-compensated measuring probe has a measuring mechanism with several sensors for the varying directions of motion. By virtue of the appropriate mechanical arrangement of the sensors relative to the directions of motion, a relative motion between the measuring probe and a workpiece with a Z motion component results in a signal alteration only in the case of the sensor assigned to the Z direction.

In a further variant the measuring mechanism may also have been constructed mechanically in such a way that specific probing sensors have been assigned to the varying deflection directions in order to register the varying directions of motion of the relative motions between the measuring probe and a workpiece. By virtue of the mechanical arrangement and orientation thereof, it is ensured that in such a variant only the signal of the probing sensor assigned to the Z direction has to be temperature-compensated. To this end, based on the signal of the probing sensor assigned to the Z direction, an activating signal can be output to the linking device. As an alternative to this, only the signal of the probing sensor assigned to the Z direction is compensated as regards temperature. The motion-direction sensor can therefore be dispensed with or serves just to engage the compensation only in the case of signals of the sensor assigned to the Z direction.

In another variant of the temperature-compensated measuring probe, the numerical control system of the workpiece-processing machine communicates the direction of motion to the measuring probe via a data interface at the start of every measuring motion, so that in the case of motions along the Z axis the temperature compensation has to be activated by the linking device.

A further variant of the temperature-compensated measuring probe has several—for example, three or four (or more)—probing sensors, for example in the form of strain gauges (DMS) or piezoelectric sensors. These each constitute a specific probing sensor. Each deflection direction here brings about a signal alteration of one, two, three etc. or of all probing sensors. By evaluation of the probing-sensor signals, both the deflection direction in space and the magnitude of the deflection can be determined. Here too, only the signal of the sensor assigned to the Z direction is temperature-compensated.

In another variant, sensors have been provided in order to register the varying directions of motion of relative motions between the measuring probe and a workpiece and to evaluate a probing operation at a probing angle $\alpha$ in the XYZ space inclined relative to the XY plane. In this case an established total measured value is compensated proportionally to the Z component by, for example, a total measured value being resolved into a measured-value component in the Z direction and a measured-value component in the X direction and/or in the Y direction. A delay-time that is representative of the lengthening of the measuring probe due to temperature is processed (for example, multiplied and then output) in the linking device with a function (for example the sine) of the probing angle.

In the case of a temperature-compensated measuring probe the probing angle can be transmitted from the machine control system to the measuring probe before the measuring probe undertakes a probing of a workpiece, or an evaluation of signals from motion-direction detectors arranged in the measuring probe provides signals reproducing the probing angle to the linking device, or a sensor, arranged for example centrically in a probing mechanism, provides to the linking device a signal for ascertaining the force arising axially.

A temperature-compensated measuring probe of such a type can, for the purpose of determining the probing angle, evaluate in the linking device both the signal-alteration speed in the probing sensor and a probing force measured with one or more sensors in the shaft of the probing device or in the supporting body.

For the purpose of determining the probing angle, at several places in the supporting body or on the supports thereof in the housing of the measuring probe, sensors may have been arranged which have been set up to provide, to the linking device, force progressions arising when the measuring probe undertakes a probing of a workpiece.

Another variant of the measuring probe has several sensors in the measuring probe, which have respectively been provided for the varying directions of motion of the relative motions between the measuring probe and a workpiece. By virtue of their mechanical arrangement and orientation, these sensors respectively emit a different signal in the event of deflection. On the basis of these signals a deflection vector that reproduces the deflection angle can then be ascertained in the linking device. The delay-time of a probing switching signal is then multiplied in the linking device by the sine of the probing angle with a view to temperature compensation.

Another variant of the temperature-compensated measuring probe has several probing sensors for the varying directions of motion of the relative motions between the measuring probe and a workpiece. By virtue of the mechanical arrangement and orientation of the probing sensors, it is ensured that only by a probing sensor assigned to the Z direction is a signal activating the temperature compensation output to the linking device. Alternatively or additionally, also only the signal of the probing sensor assigned to the Z direction can be temperature-compensated.

In another variant of the temperature-compensated measuring probe, a direction of motion communicated to the measuring probe has to be specified to the linking device manually by means of a switch. As an alternative to this, the direction of motion of the measuring probe may also have to be specified to the linking device by the numerical control system of the workpiece-processing machine. Depending on the machine concept, either the measuring probe may move in relation to the stationary workpiece or the measuring probe may be stationary and the workpiece may be moved towards the measuring probe via a movement of the table.

Finally, a temperature compensation of a measuring probe may also be undertaken by the measuring probe communicating, via a data interface, to a numerical control system of a workpiece-processing machine at the start of every measuring motion, or at temporal intervals, a temperature-correction value or a length-correction value which in the case of measurements along the Z axis the numerical control system sets off against the temperature compensation with the position value ascertained via a displacement-measuring system of the workpiece-processing machine. In this connection, in the case of probing operations in the space, that is to say, in the case of from 0° or 90° relative to one or more axes of a differing probing direction, the numerical control system of the workpiece-processing machine can also set off the component in the Z direction proportionally.

A process, based on the procedure presented herein, for temperature compensation of a measuring probe which is to be received in a workpiece-processing machine comprises the following steps:
probing a workpiece by means of a probing device of the measuring probe;
converting such probing operations into signals by means of at least one probing sensor of the measuring probe;
generating a signal that is representative of the temperature of the measuring probe by means of at least one temperature sensor which has been assigned to the measuring probe; and
linking the signals of the at least one probing sensor with the signals of the temperature sensor to yield a temperature-compensated probing signal of the measuring probe, which is intended to be output to a numerical control system of the workpiece-processing machine.

In a variant of this process, signals of several temperature sensors assigned to the measuring probe can be linked in the linking device with the signals of the at least one probing sensor to yield a temperature-compensated probing signal of the measuring probe.

Moreover, in this process the signals of the at least one probing sensor can be linked with the signals of the/each temperature sensor to yield a temperature-compensated probing signal in such a manner that, depending on the temperature that the signal of the/each temperature sensor reproduces, a signal of the probing sensor is output in time-delayed manner as temperature-compensated probing signal of the measuring probe, and/or the signals of the at least one probing sensor are linked with the signals of the/each temperature sensor to yield a temperature-compensated probing signal in such a manner that, depending on the temperature that the signal of the/each temperature sensor reproduces, a switching threshold of a signal of the probing sensor is changed, so that the signal of the at least one probing sensor is output as temperature-compensated probing signal of the measuring probe, and/or the signals of the at least one probing sensor are with the signals of the/each temperature sensor to yield a temperature-compensated probing signal in such a manner that the signals of the/each temperature sensor are changed in accordance with a stored function with respect to time, progression and/or magnitude, and a corresponding switching threshold is specified to the at least one probing sensor of the measuring probe.

For this process a motion-direction sensor can be employed that (i) distinguishes at least relative motions between measuring probe and workpiece along the central Z axis of the measuring probe from relative motions between measuring probe and workpiece in the X,Y bearing plane of the measuring probe and (ii) emits direction signals reproducing this to the linking device, and whereby in the case of relative motions between measuring probe and workpiece along the central Z axis of the measuring probe the linking device outputs temperature-compensated probing signals and in the case of relative motions between measuring probe and workpiece in the X,Y bearing plane of the measuring probe the linking device outputs non-temperature-compensated signals of the at least one probing sensor.

In this process the motion-direction detector can ascertain the direction signals from the signal-alteration rate of the displacement-dependent analogue measuring signal and in the case of relative motions between measuring probe and workpiece along the central Z axis can output temperature-compensated probing signals, and in the case of relative motions between measuring probe and workpiece in the X,Y bearing plane of the measuring probe can output non-temperature-compensated signals of the at least one probing sensor, and/or the motion-direction detector can appraise a high signal-alteration rate of the displacement-dependent analogue measuring signal of the at least one probing sensor as relative motions between measuring probe and workpiece along the central Z axis and can appraise a comparatively low signal-alteration rate of the displacement-dependent analogue measuring signal of the at least one probing sensor as relative motions between measuring probe and workpiece in the X,Y bearing plane, and/or several motion-direction sensors for the varying relative motions between measuring probe and workpiece can ensure, by virtue of the mechanical arrangement and orientation thereof, that only in the case of a motion-direction sensor assigned to the Z direction is a signal activating the temperature compensation output to the linking device.

With this process, or variants thereof, acceleration sensors can register the varying directions of the relative motions between measuring probe and workpiece and can ensure, by virtue of the mechanical arrangement and orientation thereof, that only in the case of a motion-direction sensor assigned to the Z direction is a signal activating the temperature compensation output to the linking device.

With this process, or variants thereof, the direction of motion, communicated to the measuring probe, of the relative motions between measuring probe and workpiece can be specified to the linking device manually by means of a switch, and/or the direction of motion, communicated to the measuring probe, of the relative motions between measuring probe and workpiece can be specified to the linking device by the numerical control system of the workpiece-processing machine.

With this process, or variants thereof, the numerical control system of the workpiece-processing machine can communicate the direction of the relative motions between measuring probe and workpiece to the measuring probe via a data interface at the start of every measuring motion, so that in the case of relative motions between measuring probe and workpiece along the Z axis of the measuring probe the temperature compensation has to be activated by the linking device, and/or the measuring probe can communicate, via a data interface, to a numerical control system of a workpiece-processing machine at the start of every measuring motion, or at temporal intervals, a temperature-correction value or length-correction value which in the case of measurements along the Z axis the numerical control system sets off against the temperature-compensation signal with the position value ascertained via a displacement-measuring system of the workpiece-processing machine.

A further variant of the temperature compensation uses sensor signals in order to register the varying directions of motion of relative motions between the measuring probe and a workpiece and to evaluate a probing operation at a probing angle $\alpha$ in the XYZ space inclined relative to the XY plane, whereby an established total measured value is compensated proportionally to the Z component by a delay-time having to be processed in the linking device with a function of the probing angle $\alpha$.

In this connection, (i) the probing angle $\alpha$ can be transmitted from the machine control system to the measuring probe before the measuring probe undertakes a probing of a workpiece, or (ii) signals from motion-direction detectors arranged in the measuring probe reproduce the probing angle $\alpha$, which are supplied to the linking device, or (iii) a signal from a sensor assigned to the probing device for ascertaining the force arising axially is supplied to the linking device.

In particular, the temperature compensation can also for determining the probing angle $\alpha$ both the signal-alteration speed in the probing sensor and a probing force measured in the shaft of the probing device TE or in the supporting body with one or more sensors is evaluated in the linking device.

For the purpose of determining the probing angle $\alpha$, signals can be drawn upon that originate from sensors arranged at several places on the supporting body or on supports thereof in the housing of the measuring probe, which have been set up to provide, to the linking device, force progressions arising when the measuring probe undertakes a probing of a workpiece.

In this connection, several sensors may have been provided in the measuring probe for the varying directions of motion of the relative motions between the measuring probe and a workpiece, which by virtue of their mechanical arrangement and orientation all respectively emit a signal in the event of deflection, on the basis of which the deflection angle $\alpha$ is ascertained in the linking device, and whereby the delay of a probing switching signal is multiplied by the sine of the probing angle $\alpha$ with a view to temperature compensation.

BRIEF DESCRIPTION OF THE DRAWING

Further objectives, features, advantages and application options will become apparent from the following description of some embodiments and associated drawings. In this connection, all the features described and/or represented pictorially constitute, in themselves or in arbitrary combination, the subject-matter disclosed herein, also irrespective of their grouping in the claims, or of their subordinating references.

FIGS. 5 and 6 show measuring probes schematically in longitudinal section with varying lengthening and in varying probing situations.

DETAILED DESCRIPTION

A temperature-compensated measuring probe to be received in a workpiece-processing machine, measuring in contacting or non-contacting manner, serves for registering measured values in respect of a workpiece and for outputting signals that are representative of the measured values.

Figure 1:
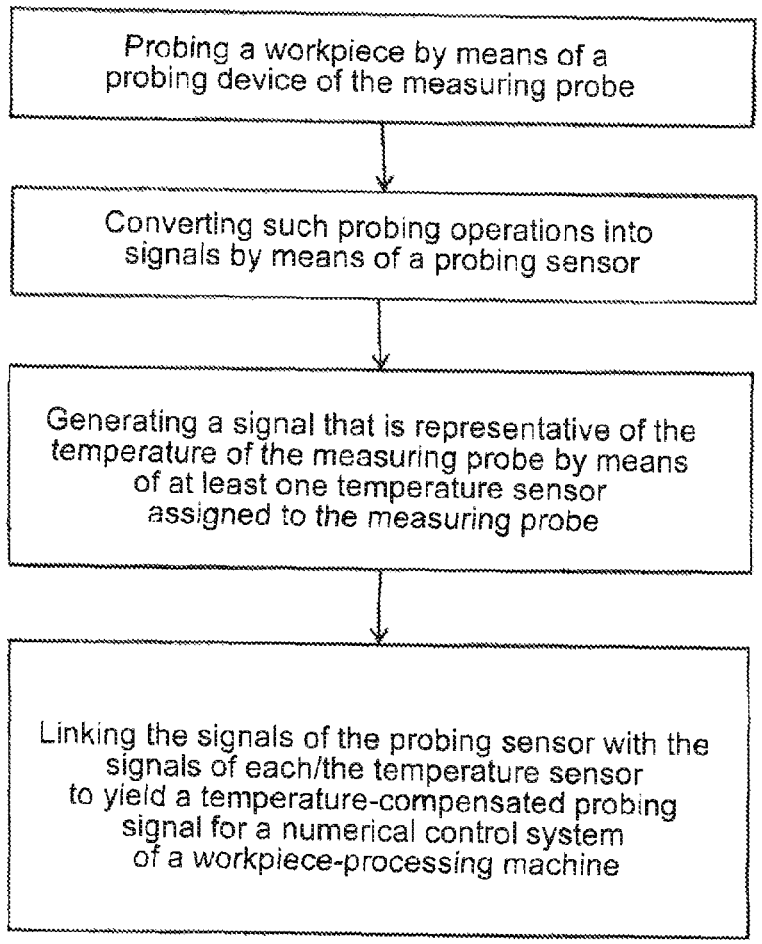
FIG. 1 shows a flow chart of a process variant presented herein.
Figure 2:
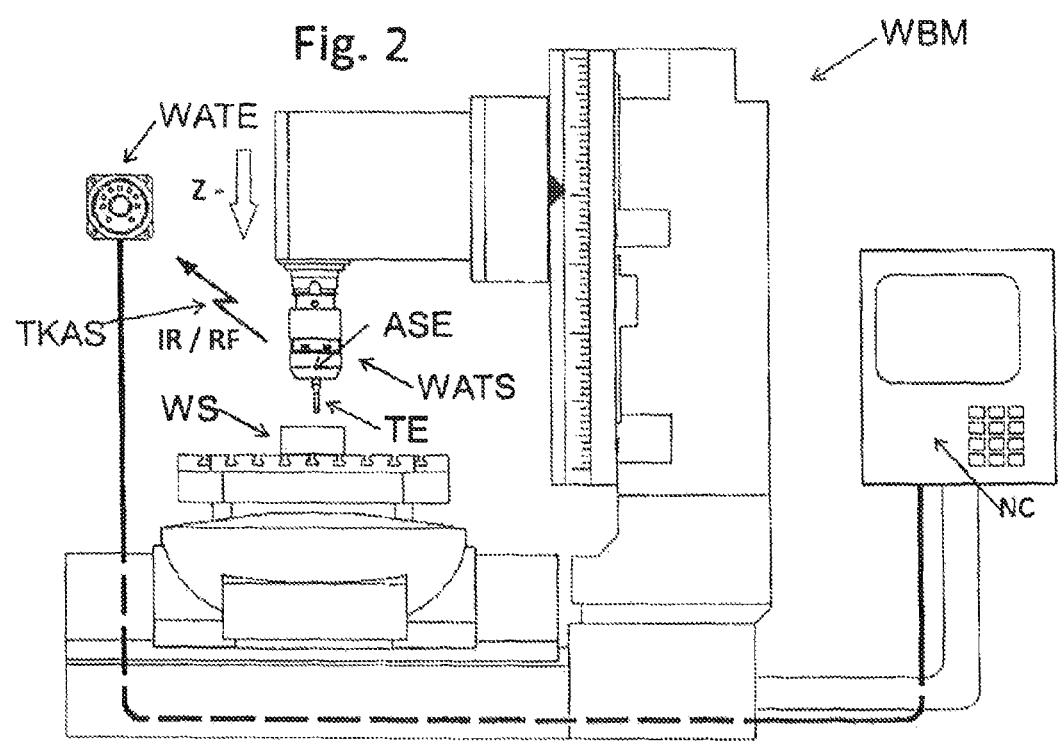
FIG. 2 shows schematically a machine tool which has been coupled with a machine control system which has been set up to receive signals from a measuring probe and, where appropriate, also to transmit signals to said measuring probe.

As illustrated in FIG. 1, a probing device of the measuring probe serves for one-dimensional or multi-dimensional probing of a workpiece. This probing device drives a probing sensor for converting such probing operations into signals. A temperature sensor assigned to the measuring probe generates a signal that is representative of the temperature of the measuring probe. In a linking device the signals of the probing sensor are then linked with the signals of the temperature sensor to yield a temperature-compensated probing signal which is intended to be output to a numerical control system of the workpiece-processing machine if the probing operation is effected along the Z (central) axis of the measuring probe. Otherwise the non-compensated signal of the probing sensor is output to the numerical control system of the workpiece-processing machine.

In a process variant, signals of several temperature sensors assigned to the measuring probe are linked in the linking device with the signals of the probing sensor to yield a temperature-compensated probing signal.

In this connection, the signals of the/each probing sensor are linked with the signals of the/each temperature sensor to yield a temperature-compensated probing signal in such a manner that, depending on the temperature that the signal of the/each temperature sensor reproduces, a signal of the probing sensor is output in time-delayed manner as temperature-compensated probing signal. As an alternative to this, the signal of the/each probing sensor can be linked with the signals of the/each temperature sensor and with a temperature gradient generated from the temperature signal(s) to yield a temperature-compensated probing signal in such a manner that, depending on the temperature that the signal of the/each temperature sensor reproduces, a signal of the probing sensor is output in time-delayed manner as temperature-compensated probing signal. This is also illustrated in FIGS. 3, 4.

With a view to temperature compensation of a measuring probe outputting analogue signals (see also, for example, FIGS. 5, 6), the signal of the/each probing sensor ASE can be linked with the signals of the/each temperature sensor TS1 ... n to yield a temperature-compensated probing signal TKAS in such a manner that, depending on the temperature that the signal T of the/each temperature sensor TS1 ... n reproduces, a switching threshold of a signal of the probing sensor ASE is changed, so that the signal of the probing sensor ASE is output as temperature-compensated probing signal TKAS. Each probing sensor ASE has an infrared (IR) or Radio Frequency (RD) transmitter WATS, the signals of which are received by a receiver WAIE and forwarded to a machine control NC.

Figure 3:
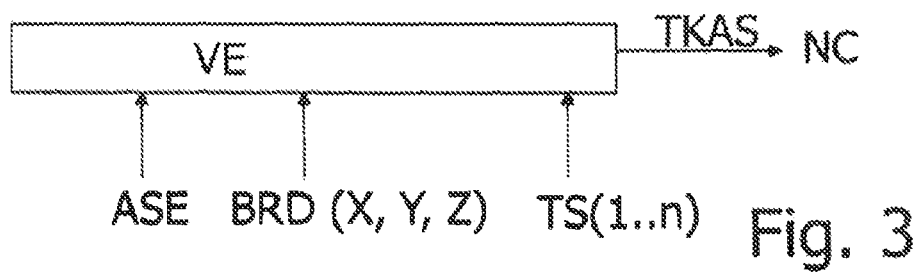
FIGS. 3 and 4 show how the signals of each probing sensor are linked with the signals of each temperature sensor to yield a temperature-compensated probing signal.
Figure 4:
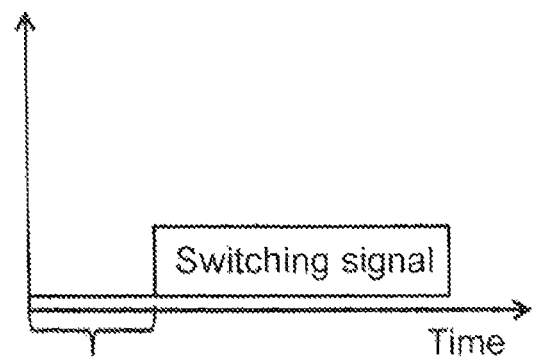

A motion-direction detector BRD can distinguish at least relative motions between the measuring probe and a workpiece along the central Z axis of the measuring probe from the relative motions between the measuring probe and a workpiece in the X,Y bearing plane, and can emit direction signals reproducing this to the linking device VE (see FIG. 3). The linking device VE is a logic circuit or a microcontroller. This linking device VE has been set up and is intended to output temperature-compensated probing signals TKAS in the case of relative motions between the measuring probe and a workpiece along the central Z axis of the measuring probe, and to output non-temperature-compensated signals of the probing sensor ASE in the case of relative motions between the measuring probe and a workpiece in the X,Y bearing plane of the measuring probe.

The motion-direction detector BRD can in this connection ascertain the direction signals from the signal-alteration rate of the displacement-dependent analogue measuring signal (see FIG. 6), and can emit the direction signals to the linking device VE. In the case of relative motions between the measuring probe and a workpiece along the central Z axis of the measuring probe the linking device VE outputs temperature-compensated probing signals TKAS, and in the case of relative motions between the measuring probe and a workpiece in the X,Y bearing plane of the measuring probe the linking device VE outputs non-temperature-compensated signals of the probing sensor ASE.

As illustrated in FIG. 6, the motion-direction detector BRD appraises a high signal-alteration rate of the displacement-dependent analogue measuring signal of the probing sensor ASE as relative motions between the measuring probe and a workpiece along the central Z axis of the measuring probe. A comparatively low signal-alteration rate of the displacement-dependent analogue measuring signal of the probing sensor ASE is appraised as relative motion between the measuring probe and a workpiece in the X,Y bearing plane of the measuring probe.

In the variants presented above, the sensorics in the probe distinguish between measurements in the case of probing operations in lateral XY directions and probing operations in the axial Z direction. Since a temperature-conditioned expansion of the measuring probe has an effect only on the measurements in the Z direction, but not on measurements in the XY direction, only the probing signals of the measurements in the Z direction are output in time-delayed manner. In one of the variants presented above, the probing direction is distinguished on the basis of the signal-alteration speed at the sensor.

In the case of a probing operation in the Z direction, the speed of the transmission member in the sensor and the rate of feed of the measuring probe in the Z direction have a ratio of 1:1. The probing speed in the XY direction, on the other hand, is given to the sensor more slowly in accordance with the leverage ratio of the measuring mechanism (R/L). On the basis of the signal-alteration speed a distinction can be made, in the manner presented below, as to whether it is a question of an axial or a lateral probing operation.

In the solutions described above, the measuring probe is employed only for probing operations in the direction of the principal axes X, Y or Z. Oblique probing operations in the XY plane are therefore also possible, since the signal-alteration speed in the case of rotationally symmetrical measuring mechanisms of the variants disclosed herein does not differ from a probing operation exactly in the X or Y direction. Probing operations in a direction inclined relative to the XY plane ($0°<\alpha<90°$), however, have not been provided in this case.

A direction-dependent temperature compensation will be elucidated below that also enables probing operations with the measuring probe to be executed in the XYZ space that proportionally take account of the Z axis. In this connection a measured value is compensated proportionally to the Z component, whereby the sensorics split a total measured value into a measured-value component in the Z direction and a measured-value component in the X direction and/or in the Y direction, and delimit these two components from one another where appropriate.

Figure 7:
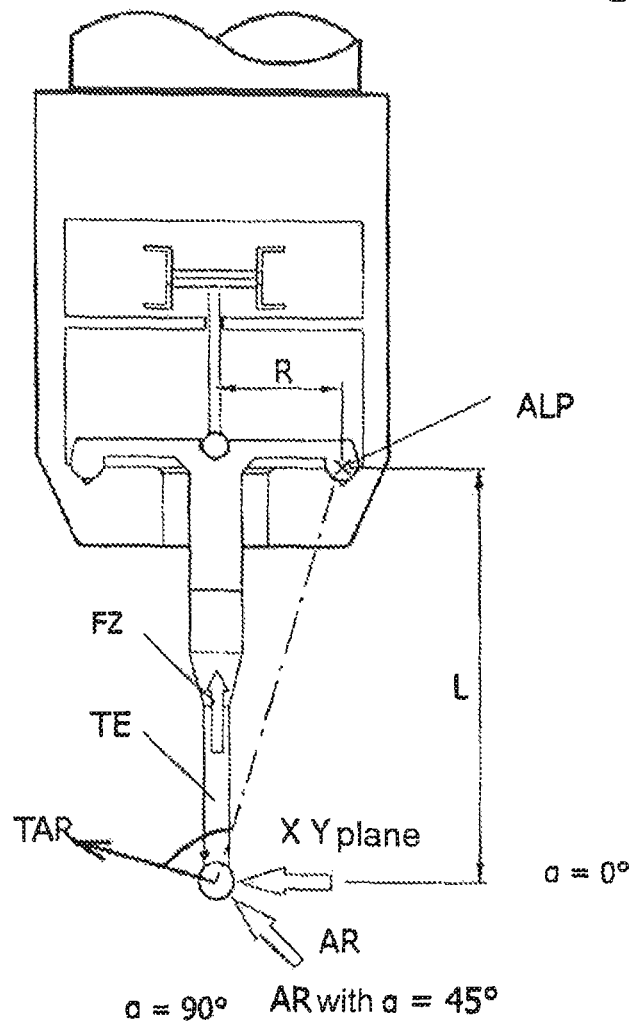
FIG. 7 shows the geometrical conditions in the case of a measuring probe which is undertaking a probing of a workpiece in an arbitrary XYZ direction.

In the case of measuring-mechanism variants of the type described above, the supporting body in the position of rest is pushed into its counter-bearing by a spring force. In the case of an XY probing operation, the supporting body tilts about a support point ALP. This support point ALP is located on the outer region of the supporting body. The geometrical conditions relating to this case have been illustrated in FIG. 7. Here, in exemplary manner, a probing operation with a probing angle $\alpha=45°$ relative to the XY plane has been represented. Depending on the radius R of the support point ALP of the supporting body from the central longitudinal axis of the probing device TE and also on an effective length L of the probing device TE, the tip of the probing device TE is deflected in an actual deflection direction TAR which differs from the probing direction AR.

Provided that the probing operations are restricted to directions exactly in the XY plane or in the Z direction, by virtue of these kinematics the probing direction can be derived on the basis of the signal-alteration speed. In the case of these probing operations implemented hitherto, the probing angle always amounts to 0° or 90° relative to one of the X, Y or Z principal axes. In these cases the signal-alteration speed can be recognised as less than or greater than a defined threshold value and can be evaluated accordingly.

In the case of an arbitrary probing angle α, 0°<α<90°, relative to one of the X, Y or Z principal axes an unambiguous recognition and subsequent evaluation is, however, not possible. This will be illustrated on the basis of the diagram in FIG. 8.

Figure 8:
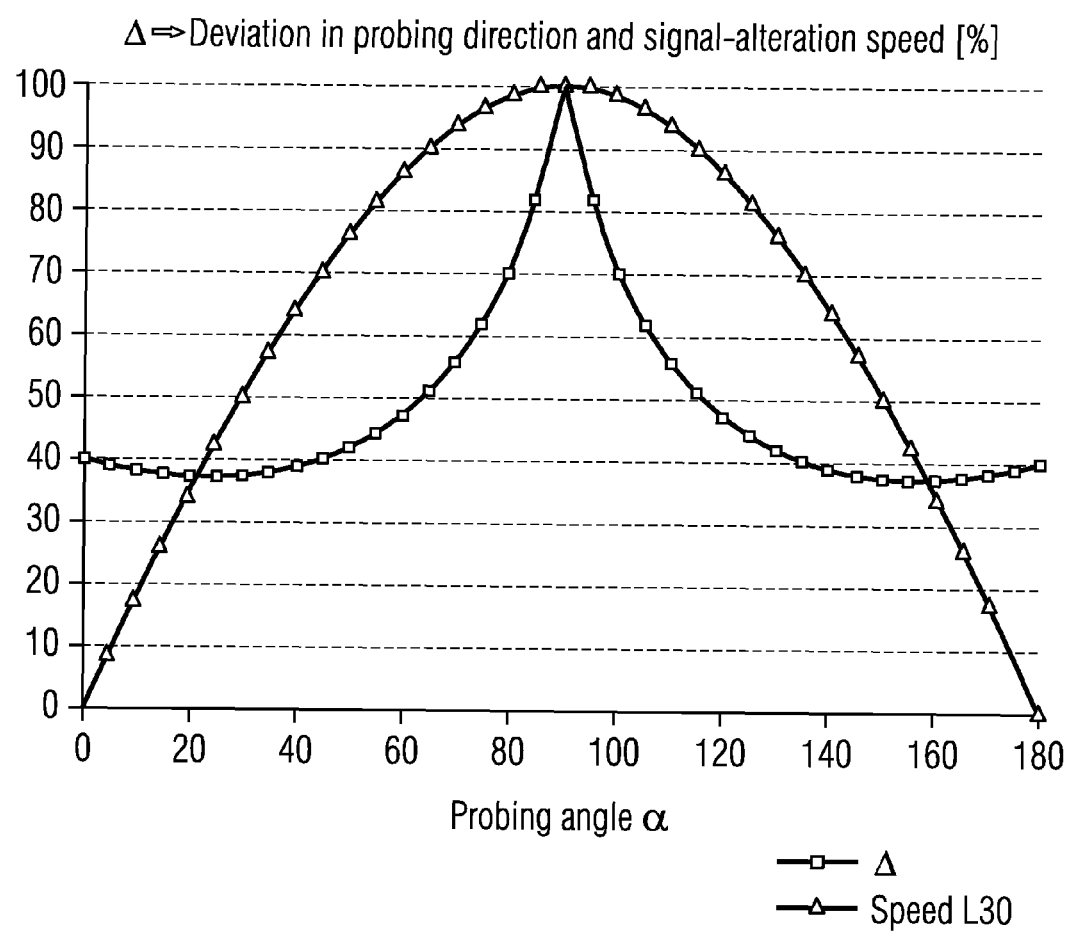
FIG. 8 shows a diagram in which the influence of the change in length of the measuring probe on the result of measurement has been illustrated as a function of the probing angle $\alpha$, and the signal-alteration speed has been illustrated as a function of the probing angle $\alpha$.

In the diagram of FIG. 8 the influence of the (temperature-induced) change in length of the measuring probe on the result of measurement has been illustrated in detail as a function of the probing angle α relative to the XY plane or to the Z direction, and the signal-alteration speed has been represented as a function of the probing angle α (here with exemplary length L of the probing insert amounting to 30 mm). Evidently the signal-alteration speed does not permit an unambiguous assignment or determination of the probing angle.

A temperature-conditioned change in length of the measuring probe ΔL_temp enters into the result of measurement, depending on the probing angle, as follows: measuring error=ΔL_temp*sin α.

In the case of a compensation by delayed output of the switching signal, the calculated delay-time therefore still has to be multiplied by sine (probing angle). This type of compensation is, for example, to be employed in a variant of the temperature-compensated measuring probe in which the non-temperature-compensated signals of the probing sensor are linked with the signals of the temperature sensor, for example in the linking device, to yield a temperature-compensated probing signal in such a manner that, depending on the temperature that the signal of the/each temperature sensor reproduces, a signal of the probing sensor is output in time-delayed manner as temperature-compensated probing signal.

In particular, if the probing speed of the measuring probe (regarded as a vector) in the measuring direction, that is to say, the probing angle α relative to the XY plane or to the Z direction and, where appropriate, the time of propagation of the (non-temperature-compensated) probing signal from the measuring probe to the numerical control system are known, in this way the extent of the delay of the transmission of the probing signal relative to the change in temperature of the measuring probe and the probing angle can be established.

Hence probing operations with arbitrary probing angle α, 0°<α<90°, relative to one of the X, Y or Z principal axes are also possible in temperature-compensated manner. In order to implement this, it will be elucidated below how, for example, the variants of the linking device VE described above have to be extended in order that a measuring probe is provided with the information as to the probing angle α at which a probing operation is presently being undertaken. In particular, this is possible with variants in which (i) the probing angle α is transmitted from the machine control system to the measuring probe before the measuring probe undertakes a probing of a workpiece, or (ii) signals from motion-direction detectors BRD arranged in the measuring probe reproduce the probing angle α, which are supplied to the linking device VE, or in which (iii) a signal from a sensor assigned to the probing device TE for ascertaining the force arising axially is supplied to the linking device VE.

If the machine control system transmits (in wireless or wire-bound manner) the probing angle α to the measuring probe, the linking device VE described above can multiply the calculated delay-time by sin α, in order in this way to establish the switching-point delay.

In a further variant, a sensor assigned to the probing device TE (for example, a piezoelectric sensor or strain gauge DMS which has been arranged in or on the probing device TE) provides to the linking device VE a signal for ascertaining the force arising axially. The axial force component FZ(α) in the Z direction along the central longitudinal axis of the probing device TE is equal to zero with α=0° and attains Fmax=100% with α=90°. The axial force component FZ(α) is determined from the leverage ratio (R/L) and from the respective deflection angle: FZ(α)αf (Fmax, R, L, α).

In the case of a probing operation in the XY plane, that is to say, in the case of a probing angle α=0°, this sensor provides no signal alteration to the linking device VE. It therefore could not be used for switching-point detection. Therefore a sensor at the end of the probing device TE is additionally required, which detects the event of a probing operation.

In this variant the signals of the probing sensor are linked in the linking device VE with the signals of the temperature sensor(s) and of the force sensor to yield a temperature-compensated probing signal. To this end, in a variant a strain gauge, for example, can register the force component FZ in the probing device TE of the supporting body and can supply it to the linking device VE.

As an alternative to this, in another variant for determining the probing angle α both the signal-alteration speed in the probing sensor and a probing force measured in the shaft of the probing device TE or in the supporting body is evaluated in the linking device VE. The linking of these two signals in the linking device VE reduces possible errors in the calculation of the probing angle α.

In a further alternative, at several—for example, three or four—places on the supporting body or on the support thereof in the housing of the measuring probe the force progressions arising upon undertaking a probing of a workpiece by the measuring probe are ascertained in the linking device VE by means of appropriate sensors (for example, strain gauges DMS or piezoelectric sensors). In this connection the deflection forces can be determined either directly within the bipartite supporting body or indirectly in the support region in the housing of the measuring probe. By evaluation of the force signals or the probing-sensor signals in the linking device VE, both the deflection direction in space and the magnitude of the deflection can be determined. The probing angle α can be calculated therefrom, so that the delay of the switching signal can be multiplied in the linking device VE by the sine of the probing angle α with a view to temperature compensation. In this connection the magnitude of the deflection can be undertaken by the linked evaluation of the force-sensor signals and of the probing-sensor signals, whereby the force-sensor signals provide the direction, and the probing-sensor signals provide the magnitude.

On the basis of the evaluation of the several (for example, three or four) DMS values or piezoelectric-signal values the deflection direction can be precisely ascertained in the linking device VE. A probing operation in the XY direction (probing angle α=0°) also changes the signal values. Therefore in a variant the switching signal can be generated in the linking device VE exclusively on the basis of the evaluation of the signal values from the sensors (strain gauges DMS or piezoelectric sensors). Hence in this variant the transmission member with the corresponding sensor can be dispensed with.

A measuring mechanism with piezoelectric sensorics is known as such, for example from U.S. Pat. No. 4,972,594 or from U.S. Pat. No. 6,090,205.

A variant has been described further above in which the measuring probe has several probing sensors for the varying directions of motion of the relative motions between the measuring probe and a workpiece, whereby by virtue of the mechanical arrangement and orientation of the probing sensors it is ensured that only by a probing sensor assigned to the Z direction is a signal activating the temperature compensation output to the linking device VE, or also only the signal of the probing sensor assigned to the Z direction is temperature-compensated.

Figure 9:
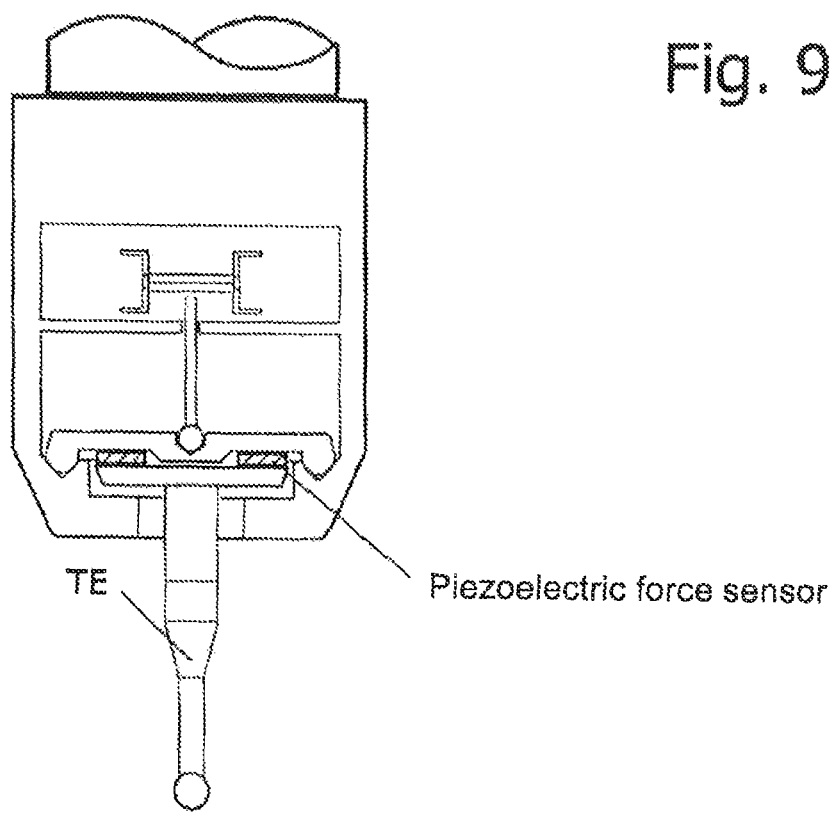
FIG. 9 shows a sectional image of a variant of a measuring probe with two of a total of four piezoelectric sensors arranged on the supporting body, situated opposite one another in pairs.
Figure 10:
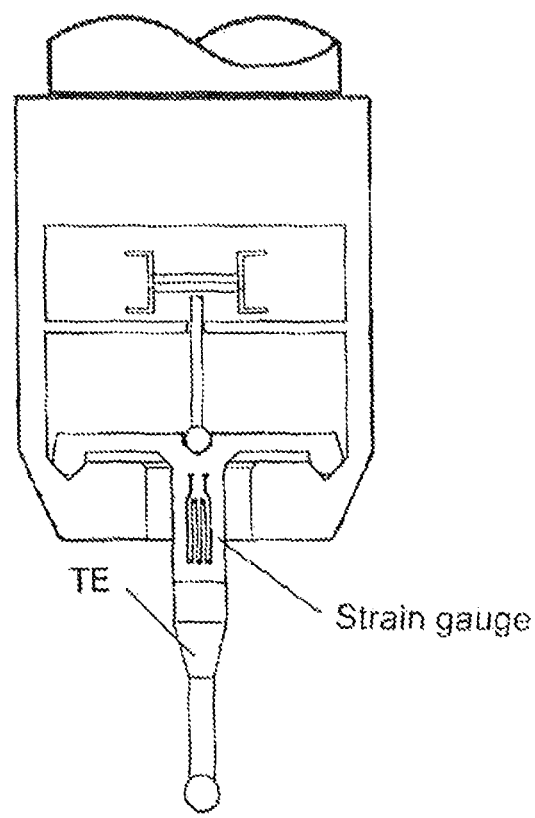
FIG. 10 shows a sectional image of a variant of a measuring probe with a sensor arranged in the shaft of the supporting body, here in the special form of a strain gauge.

This variant can be realised more efficiently by several— for example, three or four—sensors being provided in the measuring probe for the varying directions of motion of the relative motions between the measuring probe and a workpiece, which by virtue of their mechanical arrangement and orientation all respectively emit a signal in the event of deflection. On the basis of these signals, a deflection vector is computed in the linking device VE. This deflection vector reproduces the deflection angle α in the XYZ space. Hence in the linking device VE the delay of the switching signal can be multiplied by the sine of the probing angle α with a view to temperature compensation. A representation illustrating this variant is FIG. 9, with a sectional image of the measuring probe with two of a total of four piezoelectric sensors arranged on the supporting body, situated opposite one another in pairs.

In the case of a measuring probe switching in binary manner, or in the case of a measuring probe behaving outwardly (also) like a measuring probe switching in binary manner, or in the case of a measuring probe with probing sensor switching in binary manner, no information about the probing direction can be ascertained from the switching signal. In a variant, in the measuring probe several motion-direction sensors for the varying directions of motion of the relative motions between the measuring probe and a workpiece therefore have the effect, by virtue of their mechanical arrangement and orientation, that only in the case of a motion-direction sensor assigned to the Z direction is a signal activating the temperature compensation output to the linking device VE. In an alternative to this variant, the acceleration sensors register the varying directions of motion of the relative motions between the measuring probe and a workpiece. By virtue of the mechanical arrangement and orientation thereof, it is ensured that only in the case of a motion-direction sensor assigned to the Z direction is a signal activating the temperature compensation output to the linking device VE.

As an alternative to this, the direction of motion of the relative motions between the measuring probe and a workpiece can be specified to the linking device VE manually by means of a switch, not illustrated further, or by the numerical control system NC of the workpiece-processing machine WBM.

The variants, described in the foregoing, of the process and of the apparatus serve merely for better understanding of the structure, of the mode of operation and of the properties of the solution that has been presented; they do not restrict the disclosure to, for instance, the embodiments. The Figures are schematic representations, wherein essential properties and effects have been represented, in part, in distinctly enlarged manner in order to clarify the functions, principles of action, technical configurations and features. In this connection, each mode of operation, each principle, each technical configuration and each feature that has/have been disclosed in the Figures or in the text can be freely and arbitrarily combined with all the claims, with each feature in the text and in the other Figures, with other modes of operation, principles, technical configurations and features that are contained in this disclosure or result therefrom, so that all conceivable combinations are to be attributed to the described solution. In this connection, combinations between all individual remarks in the text, that is to say, in each section of the description, in the claims and also combinations between various variants in the text, in the claims and in the Figures are also encompassed.

The claims also do not limit the disclosure and hence the combination options of all the demonstrated features amongst themselves. All the demonstrated features have been disclosed herein explicitly, also individually and in combination with all other features.

The invention claimed is:

1. A temperature-compensated measuring probe (MTS, MTE), to be received in a workpiece-processing machine (WBM) and measuring in contacting or non-contacting manner, for registering measured values in respect of a workpiece (WS) and for outputting signals that are representative of the measured values, wherein the measuring probe (MTS, MTE) comprises a probing device (TE) for one-dimensional or multidimensional probing of a workpiece (WS), at least one probing sensor (ASE) for converting such probing operations into signals, at least one temperature sensor (TS) which has been assigned to the measuring probe (MTS) in order to generate a signal (T) that is representative of the temperature of the measuring probe (MTS), and a linking device (VE) which links the signals of at least one probing sensor (ASE) with the signals (T) of the temperature sensor (TS) to yield a temperature-compensated probing signal (TKAS) which is intended to be output to a numerical control system (NC) of the workpiece-processing machine (WBM), wherein the linking device (VE) links the signals of at least one probing sensor (ASE) with the signals (T) of the/each temperature sensor (TS) to yield a temperature-compensated probing signal (TKAS) in such a manner that, depending on the temperature that the signal (T) of the/each temperature sensor (TS) reproduces and, where appropriate, on a rate of feed of the measuring probe in the course of probing, a signal of the at least one probing sensor (ASE) is output in time-delayed manner as temperature-compensated probing signal (TKAS), and wherein the time-delayed manner is determined by a delay-time processed in the linking device (VE).

2. The temperature-compensated measuring probe (MTS, MTE) of claim 1, wherein several temperature sensors (TS) have been assigned to the measuring probe (MTS), the signals of which are linked in the linking device (VE) with the signals of at least one probing sensor (ASE) to yield a temperature-compensated probing signal (TKAS).

3. A temperature-compensated measuring probe (MTS, MTE), to be received in a workpiece-processing machine (WBM) and measuring in contacting or non-contacting manner, for registering measured values in respect of a workpiece (WS) and for outputting signals that are representative of the measured values, wherein the measuring probe (MTS, MTE) comprises a probing device (TE) for one-dimensional or multidimensional probing of a workpiece (WS), at least one probing sensor (ASE) for converting such probing operations into signals, at least one temperature sensor (TS) which has been assigned to the measuring probe (MTS) in order to generate a signal (T) that is representative of the temperature of the measuring probe (MTS), and a linking device (VE) which links the signals of at least one probing sensor (ASE) with the signals (T) of the temperature sensor (TS) to yield a temperature-compensated probing signal (TKAS) which is intended to be output to a numerical control system (NC) of the workpiece-processing machine (WBM), wherein the linking device (VE) links the signals of the at least one probing sensor (ASE) with the signals (T) of the/each temperature sensor (TS) to yield the temperature-compensated probing signal (TKAS) in such a manner that, depending on the temperature that the signal (T) of the/each temperature sensor (TS) reproduces, a switching threshold of a signal of the at least one probing sensor (ASE) is changed, so that the signal of the probing sensor (ASE) is output as the temperature-compensated probing signal (TKAS), and/or wherein the linking device (VE) links the signals of the at least one probing sensor (ASE) with the signals (T) of the/each temperature sensor (TS) to yield the temperature-compensated probing signal (TKAS) in such a manner that the signals (T) of the/each temperature sensor (TS) are changed in accordance with a stored function with respect to time, progression and/or magnitude, and a corresponding switching threshold is specified to the at least one probing sensor (ASE).

4. The temperature-compensated measuring probe (MTS, MTE) of claim 3, wherein one or more strain gauges has/have been fitted to the measuring probe in order to measure a temperature-conditioned lengthening of the measuring probe at a representative place and to transmit this result of measurement to a numerical control system of a workpiece-processing machine for setting off, and/or wherein the measuring probe draws upon the signal (T) of the/each temperature sensor (TS) for the purpose of determining the temperature-conditioned lengthening of the measuring probe, in order to transmit the value of this temperature-conditioned lengthening to the numerical control system of the workpiece-processing machine for setting off.

5. The temperature-compensated measuring probe (MTS, MTE) of claim 4, wherein the measuring probe has a housing (G) in which an annular support bearing (SL) has been formed which defines an X,Y bearing plane and a central Z axis, normal thereto, of the measuring probe, a supporting body (TK) comprises an annular counter-bearing (GL) by which a longitudinal axis of the supporting body (TK) has been defined, a spring (F) has been clamped between the housing (G) and the supporting body (TK) and endeavors to keep the latter in a position of rest in which the counter-bearing (GL) abuts the support bearing (SL) and the longitudinal axis of the supporting body (TK) coincides at least approximately with the central axis Z of the measuring probe (MTS, MTE), a stylus socket (TSA) has been arranged centrally on the supporting body (TK) in order to receive a stylus (TS), a transmission member (UG) is guided in the housing (G) so as to be displaceable along the central Z axis in order to convert arbitrary deflections of the supporting body (TK), brought about by a relative motion between the measuring probe and a workpiece, out of its position of rest into rectilinear motions, and at least one probing sensor (ASE) converts such motions of the transmission member into the signals, whereby one end of the transmission member (UG) has been centrically arranged on the stylus socket (TSA) and only a portion adjoining the other end is guided in the direction of the central axis Z, whereby the transmission member (UG) has been arranged at a place on the supporting body (TK) that, viewed from the at least one probing sensor (ASE), lies beyond the bearing plane, whereby the at least one probing sensor (ASE) is part of a light barrier with a displacement-dependent analogue measuring signal or with a binary switching signal and the stylus socket (TSA) has been arranged on the supporting body (TK) or is part of the supporting body (TK) and is guided so as to be displaceable along the longitudinal axis thereof and has been resiliently biased in the direction towards a normal position defined by a stop.

6. A temperature-compensated measuring probe (MTS, MTE), to be received in a workpiece-processing machine (WBM) and measuring in contacting or non-contacting manner, for registering measured values in respect of a workpiece (WS) and for outputting signals that are representative of the measured values, wherein the measuring probe (MTS, MTE) comprises a probing device (TE) for one-dimensional or multi-dimensional probing of a workpiece (WS), at least one probing sensor (ASE) for converting such probing operations into signals, a linking device (VE) which links the signals of at least one probing sensor (ASE) to a numerical control system (NC) of the workpiece-processing machine (WBM), wherein a motion-direction detector (BRD) has been provided which has been set up (i) to distinguish at least relative motions between the measuring probe and a workpiece along the central Z axis of the measuring probe from motions in the X,Y bearing plane and (ii) to emit direction signals reproducing this to the linking device (VE), and wherein the linking device (VE) has been set up to output temperature-compensated probing signals (TKAS) in the case of relative motions between the measuring probe and a workpiece along the central Z axis of the measuring probe and to output non-temperature-compensated signals of the at least one probing sensor (ASE) in the case of relative motions between the measuring probe and a workpiece in the X,Y bearing plane of the measuring probe.

7. The temperature-compensated measuring probe (MTS, MTE) of claim 6, wherein the motion-direction detector (BRD) has been set up to ascertain the direction signals from a signal-alteration rate of a displacement-dependent analogue measuring signal and to output temperature-compensated probing signals (TKAS) in the case of relative motions between the measuring probe and a workpiece along the central Z axis of the measuring probe and to output non-temperature-compensated signals of the at least one probing sensor (ASE) in the case of relative motions between the measuring probe and a workpiece in the X,Y bearing plane of the measuring probe, and/or wherein the motion-direction detector (BRD) appraises a high signal-alteration rate of the displacement-dependent analogue measuring signal of the probing sensor (ASE) as relative motion between the measuring probe and a workpiece along the central Z axis of the measuring probe and appraises a comparatively low signal-alteration rate of the displacement-dependent analogue measuring signal of the at least one probing sensor (ASE) as relative motion between the measuring probe and a workpiece in the X,Y bearing plane of the measuring probe.

8. The temperature-compensated measuring probe (MTS, MTE) of claim 6, wherein several probing sensors (ASE) for the varying directions of motion of the relative motions between the measuring probe and a workpiece have been provided, wherein by virtue of the mechanical arrangement and orientation of the at least one probing sensor (ASE) it is ensured that only by a probing sensor (ASE) assigned to the Z direction is a signal activating the temperature compensation output to the linking device (VE) and/or only the signal of the at least one probing sensor (ASE) assigned to the Z direction has to be compensated as regards temperature.

9. The temperature-compensated measuring probe (MTS, MTE) of claim 6, further comprising acceleration sensors that register the varying directions of motion of the relative motions between the measuring probe and a workpiece, wherein by virtue of the mechanical arrangement and orientation of the acceleration sensors, a motion-direction sensor assigned to the Z direction outputs to the linking device (VE) a signal activating the temperature compensation.

10. The temperature-compensated measuring probe (MTS, MTE) of claim 6, wherein sensors have been provided in order to register the varying directions of motion of relative motions between the measuring probe and a workpiece and to evaluate a probing operation at a probing angle ($\alpha$) inclined relative to the XY plane in the XYZ space, whereby an established total measured value is compensated proportionally to the Z component by a delay-time having to be processed in the linking device (VE) with a function of the probing angle ($\alpha$).

11. The temperature-compensated measuring probe (MTS, MTE) of claim 10, wherein the probing angle ($\alpha$) is transmitted from the machine control system to the measuring probe before the measuring probe undertakes a probing of a workpiece, or (ii) signals from motion-direction detectors (BRD) arranged in the measuring probe reproduce the probing angle ($\alpha$), which are supplied to the linking device, or (iii) a signal from a sensor assigned to the probing device (TE) for ascertaining the force arising axially is supplied to the linking device (VE).

12. The temperature-compensated measuring probe (MTS, MTE) of claim 11, wherein for the purpose of determining the probing angle ($\alpha$) both the signal-alteration speed in the probing sensor and a probing force measured in the shaft of the probing device (TE) or in the supporting body with one or more sensors is evaluated in the linking device (VE).

13. The temperature-compensated measuring probe (MTS, MTE) of claim 10, wherein for the purpose of determining the probing angle ($\alpha$) sensors have been arranged at several places on a supporting body or on a support thereof in the housing of the measuring probe, which have been set up to provide, to the linking device (VE), force progressions arising when the measuring probe undertakes a probing of a workpiece.

14. The temperature-compensated measuring probe (MTS, MTE) of claim 10, wherein several sensors have been provided in the measuring probe for the varying directions of motion of the relative motions between the measuring probe and a workpiece, which by virtue of their mechanical arrangement and orientation all respectively emit a signal in the event of deflection, on the basis of which a deflection angle ($\alpha$) is ascertained in the linking device (VE), and wherein the delay of a probing switching signal is multiplied by the sine of the probing angle ($\alpha$).

15. The temperature-compensated measuring probe (MTS, MTE) of claim 6, wherein the direction of motion of the relative motions between the measuring probe and a workpiece has to be specified to the linking device (VE) manually by means of a switch, and/or
wherein the direction of motion of the relative motions between the measuring probe and a workpiece has to be specified to the linking device (VE) by the numerical control system (NC) of the workpiece-processing machine (WBM).

16. The temperature-compensated measuring probe (MTS, MTE) of claim 15, wherein the numerical control system (NC) of the workpiece-processing machine (WBM) communicates the direction of motion to the measuring probe via a data interface at the start of every measuring motion, so that in the case of a relative motion between the measuring probe and a workpiece along the Z axis of the measuring probe, temperature compensation is activated by the linking device (VE).

* * * * *